(12) United States Patent
Ionita et al.

(10) Patent No.: US 10,084,776 B2
(45) Date of Patent: Sep. 25, 2018

(54) METHODS AND SYSTEMS FOR AUTHENTICATING USERS

(71) Applicants: Mircea Ionita, Dublin (IE); Michael Peirce, Dublin (IE); James Ahern, Dunboyne (IE); Michael Stephen Watson, Darlinghurst (AU)

(72) Inventors: Mircea Ionita, Dublin (IE); Michael Peirce, Dublin (IE); James Ahern, Dunboyne (IE); Michael Stephen Watson, Darlinghurst (AU)

(73) Assignee: DAON HOLDINGS LIMITED, George Town (KY)

( * ) Notice: Subject to any disclaimer, the term of this patent is extended or adjusted under 35 U.S.C. 154(b) by 79 days.

(21) Appl. No.: 15/089,608

(22) Filed: Apr. 4, 2016

(65) Prior Publication Data

US 2017/0289144 A1   Oct. 5, 2017

(51) Int. Cl.

| G06F 21/32 | (2013.01) |
|---|---|
| H04L 29/06 | (2006.01) |
| G06K 9/00 | (2006.01) |

(52) U.S. Cl.
CPC .......... H04L 63/0861 (2013.01); G06F 21/32 (2013.01); G06K 9/00261 (2013.01); G06K 9/00288 (2013.01); G06K 9/00906 (2013.01); H04L 63/1483 (2013.01)

(58) Field of Classification Search
CPC ....................................... G06F 21/32
See application file for complete search history.

(56) References Cited

U.S. PATENT DOCUMENTS

| 7,685,629 B1 | 3/2010 | White et al. |
|---|---|---|
| 8,984,622 B1* | 3/2015 | Baldwin ............ G06K 9/00228 726/16 |
| 2006/0117188 A1* | 6/2006 | Fiske ...................... G06F 21/32 713/186 |
| 2007/0286462 A1* | 12/2007 | Usher .................. G06K 9/0061 382/115 |
| 2011/0299741 A1 | 12/2011 | Zhang et al. |

(Continued)

FOREIGN PATENT DOCUMENTS

EP          2 863 339 A2     4/2015

OTHER PUBLICATIONS

Akhtar et al., "Biometric Liveness Detection: Challenges and Research Opportunities", pp. 63-72 (Year: 2015).*

(Continued)

Primary Examiner — Thaddeus J Plecha
(74) Attorney, Agent, or Firm — Kevin McDermott, Esq.

(57) ABSTRACT

A method of authenticating users is provided that includes storing data in a buffer. The data is within a temporal window and includes biometric data extracted from frames included in a video and quality feature values calculated for each frame. Each quality feature value corresponds to a different quality feature. Moreover, the method includes calculating a score for each different quality feature using the corresponding quality feature values, and determining a most recent frame included in the video includes biometric data usable in a biometric authentication matching transaction when the calculated score for each different quality feature satisfies a respective threshold score value.

12 Claims, 8 Drawing Sheets

(56) References Cited

U.S. PATENT DOCUMENTS

| | | | |
|---|---|---|---|
| 2012/0070041 A1* | 3/2012 | Wang | G06F 21/32 |
| | | | 382/118 |
| 2013/0015946 A1* | 1/2013 | Lau | G07C 9/00 |
| | | | 340/5.2 |
| 2016/0057138 A1* | 2/2016 | Hoyos | G06T 7/73 |
| | | | 726/7 |
| 2016/0188974 A1* | 6/2016 | Mullin | G06K 9/00604 |
| | | | 348/78 |

OTHER PUBLICATIONS

Extended European Search Report for counterpart EPO Application No. 17159625.7, dated Nov. 22, 2017, pp. 1-17.
Hsu et al., Quality Assessment of Facial Images, 2006 Biometrics Symposium, Sep. 1, 2006, pp. 1-6.
Wei et al., An automatic face log collection method for video sequence, Internet Multimedia Computing and Service, Aug. 17, 2013, pp. 376-379.
Nasrollahi et al., Face Quality Assessment System in Video Sequences, Biometrics and Identity Management, May 7, 2008, pp. 10-18.
Partial European Search Report for counterpart EPO Application No. 17159625.7, dated Apr. 4, 2017, pp. 1-20.
Bharadwaj et al., Biometric Quality: From Assessment to Multibiometrics, Jan. 27, 2015, pp. 1-31.
Rua et al., Quality-Based Score Normalization and Frame Selection for Video-Based Person Authentication, Biometrics and Identity Management, May 7, 2008, pp. 1-9.

* cited by examiner

METHODS AND SYSTEMS FOR AUTHENTICATING USERS

BACKGROUND OF THE INVENTION

This invention relates generally to authentication, and more particularly, to methods and systems for authenticating users.

Users conduct transactions with many different service providers in person and remotely over the Internet. Network-based transactions conducted over the Internet may involve purchasing items from a merchant web site or accessing confidential information from a web site. Service providers that own and/or operate such websites typically require users to be successfully authenticated before being allowed to conduct a transaction on the website.

During remotely conducted network-based authentication transactions, users may provide a claim of identity and captured biometric data. The biometric data is typically captured as a single image, or picture, which is communicated to an authentication system. The authentication system conducts a matching transaction based on the single image. However, imposters have been known to impersonate users during authentication transactions by providing a false claim of identity supported by fraudulent biometric data in an effort to deceive an authenticating entity into concluding that the imposter is the person he or she claims to be. Such impersonations are known as spoofing or spoof attacks.

Impostors currently use many methods to obtain or create fraudulent biometric data that can be submitted during authentication transactions. For facial biometric data, imposters have been known to obtain two-dimensional pictures of others, from social networking sites, and to present the obtained pictures to a camera during authentication to support a false claim of identity. Moreover, imposters have been known to eavesdrop on networks during legitimate network-based authentication transactions to surreptitiously obtain genuine biometric data of users, and use the obtained biometric data for playback during fraudulent authentication transactions. Such fraudulent biometric data are known to be difficult to detect using known live-ness detection techniques. Consequently, generating trustworthy network-based authentication transaction results with biometric data captured from a user at a remote location depends on verifying the physical presence of the user during the authentication transaction as well as accurately verifying the identity of the user based on the captured biometric data. Verifying that biometric data presented during a network-based biometric authentication transaction conducted at a remote location is from a live user at the remote location is known as live-ness detection or anti-spoofing.

BRIEF DESCRIPTION OF THE INVENTION

In one aspect, a method of authenticating users is provided that includes storing data in a buffer. The data is within a temporal window and includes biometric data extracted from frames included in a video and quality feature values calculated for each frame. Each quality feature value corresponds to a different quality feature. Moreover, the method includes calculating a score for each different quality feature using the corresponding quality feature values, and determining a most recent frame included in the video includes biometric data usable in a biometric authentication matching transaction when the calculated score for each different quality feature satisfies a respective threshold score value.

In another aspect, a terminal device for authenticating users is provided that includes a processor and a memory. The memory is configured to store a buffer of data. The terminal is associated with a network and the memory is in communication with the processor and has instructions stored thereon which, when executed by the processor, cause the processor to store data in the buffer. The data is within a temporal window and includes biometric data extracted from frames included in a video and quality feature values calculated for each frame. Each quality feature value corresponds to a different quality feature. The instructions, when executed by the processor also cause the processor to calculate a score for each different quality feature using the corresponding quality features values, and to determine a most recent frame included in the video includes biometric data usable in a biometric authentication matching transaction when the calculated score for each different quality feature satisfies a respective threshold score value.

In yet another aspect, a computer program recorded on a non-transitory computer-readable recording medium included in a terminal device for enhancing accuracy of biometric authentication transaction results is provided. The computer program includes instructions, which when read and executed by the terminal device, cause the terminal device to store data in a buffer. The data is within a temporal window and includes biometric data extracted from frames included in a video and quality feature values calculated for each frame. Each quality feature value corresponds to a different quality feature. The instructions, when executed by the terminal device also cause the terminal device to calculate a score for each different quality feature using the corresponding quality features values, and to determine a most recent frame included in the video includes biometric data usable in a biometric authentication matching transaction when the calculated score for each different quality feature satisfies a respective threshold score value.

DETAILED DESCRIPTION OF THE INVENTION

Figure 1:
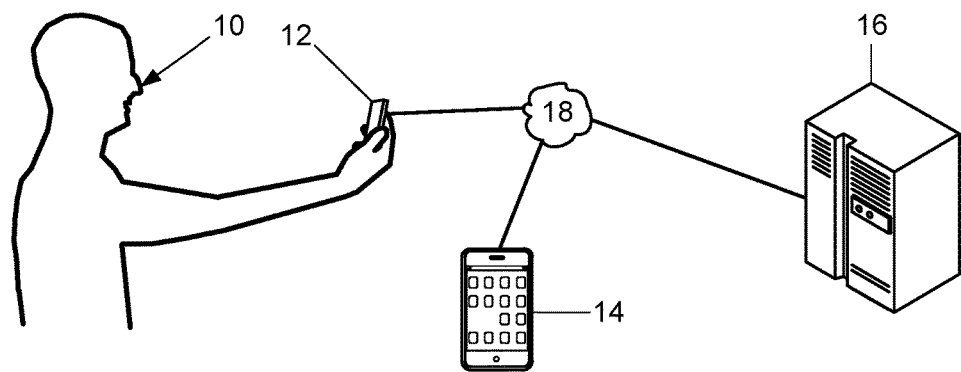
FIG. 1 is a side view of a user operating an example terminal device.

FIG. 1 is a side view of a user 10 operating an example terminal device 12 during an authentication transaction or during another operation in which biometric data captured from the user is stored as record biometric data or is processed and then stored. Specifically, the terminal device 12 and the user 10 are positioned relative to each other such that the user may operate the terminal device 12 to capture biometric data from his self. Alternatively, a person other than the user may operate the terminal device 12 while the terminal device 12 captures biometric data from the user. Moreover, the terminal device 12 may automatically capture biometric data from a user, for example, in a physical access scenario in which the user attempts to access an e-gate or door. The terminal device 12 is able to communicate with any other computer systems and any other devices capable of communicating over a communications network 18, including a terminal device 14 and a computer system 16.

Figure 2:
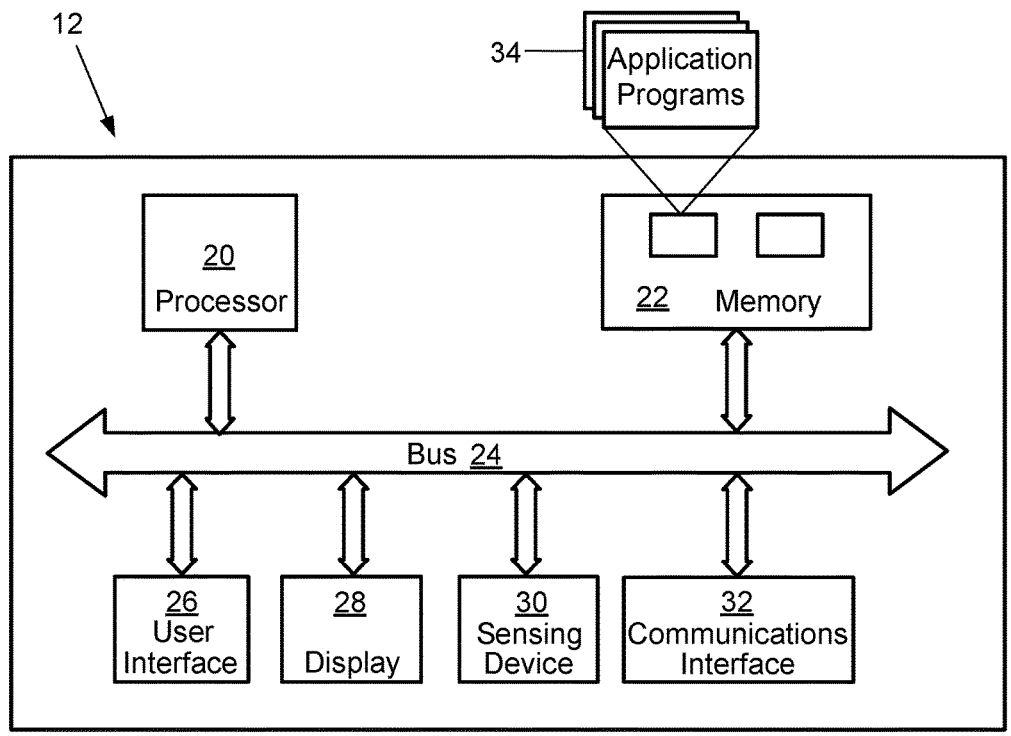
FIG. 2 is a block diagram of the example terminal device as shown in FIG. 1.

FIG. 2 is a block diagram of the example terminal device 12 shown in FIG. 1. The terminal device 12 includes one or more processors 20, a memory 22, a bus 24, a user interface 26, a display 28, a sensing device 30 and a communications interface 32. The terminal device 12 may be any device capable of processing biometric data captured from users. Such devices include, but are not limited to, a smart phone, a cellular phone, a tablet computer, a phablet computer, a laptop computer, a personal computer (PC), and any type of device having wired or wireless networking capabilities such as a personal digital assistant (PDA). Moreover, the terminal device 12 may be portable or stationary and is associated with at least one user. Alternatively, the terminal device 12 may not be associated with any specific user and may instead be owned by an entity that allows people to temporarily use the terminal device 12. For example, the terminal device 12 may belong to a coffee shop which allows customers to use the terminal device 12 while enjoying a cup of coffee in the shop.

The processor 20 executes instructions, or computer programs, stored in the memory 22. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing the functions described herein. The above examples are exemplary only, and are thus not intended to limit in any way the definition and/or meaning of the term "processor." General communication between the components in the terminal device 12 is provided via the bus 24.

As used herein, the term "computer program" is intended to encompass an executable program that exists permanently or temporarily on any computer-readable recordable medium that causes the terminal device 12 to perform at least the functions described herein. Application programs 34, also known as applications, are computer programs stored in the memory 22. Application programs 34 include, but are not limited to, an operating system, an Internet browser application, enrollment applications, authentication applications, authentication policies, a face tracking application, user live-ness detection algorithm applications, or any special computer program that manages the relationship between application software and any suitable variety of hardware that helps to make-up a computer system or computing environment.

The memory 22 may be a computer-readable recording medium used to store data including, but not limited to, computer programs and user data records. Each user data record corresponds to a different user associated with the terminal device 12. The user data record for each user includes data such as, but not limited to, record biometric data, record biometric templates and personal data of the user. The record biometric data is raw biometric data that is processed to generate at least one record biometric template that may be used to confirm the identity of a user during authentication transactions. Alternatively, the record biometric data may be used to confirm the identity of a user during authentication transactions.

The record biometric data may correspond to any biometric modality desired to be used as a basis of authentication such as, but not limited to, voice, face, finger, iris, eye vein, palm, and electrocardiogram. Moreover, record biometric data may take any form such as, but not limited to, audio recordings, photographs, and video. Videos may be a sequence of frames and may be digital or analog. The most recently captured frame in a video is the last frame in the sequence. When biometric data is captured as a video, each frame in the video includes an image of the biometric data. For example, when the captured biometric data is face, each frame in the video includes an image of the user's face.

Personal data includes any demographic information regarding a user including, but not limited to, a user's name, gender, age, date-of-birth, address, citizenship and marital status. Each user data record may also include any kind of data that may be used to enhance security of authentication transactions as described herein.

The memory 22 may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like. Furthermore, the memory 22 may include smart cards, SIMs or any other medium from which a computing device can read computer programs, applications or executable instructions.

The user interface 26 and the display 28 allow interaction between a user and the terminal device 12. The display 28 may include a visual display or monitor that displays information to a user. For example, the display 28 may be a Liquid Crystal Display (LCD), active matrix display, plasma display, or cathode ray tube (CRT). The user interface 26 may include a keypad, a keyboard, a mouse, an infrared light source, a microphone, cameras, and/or speakers. Moreover, the user interface 26 and the display 28 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the device 12 to enter data, change settings, control functions, etc. Consequently, when the touch screen is touched, the user interface 26 communicates this change to the processor 20, and settings can be changed or user entered information can be captured and stored in the memory 22.

The sensing device 30 may include Radio Frequency Identification (RFID) components or systems for receiving information from other devices. The sensing device 30 may also include components with Bluetooth, Near Field Communication (NFC), infrared, or other similar capabilities. The terminal device 12 may alternatively not include the sensing device 30.

The communications interface 32 provides the terminal device 12 with two-way data communications. Moreover, the communications interface 32 enables the terminal device 12 to conduct wireless communications such as cellular telephone calls and to wirelessly access the Internet over the network 18. By way of example, the communications interface 32 may be a digital subscriber line (DSL) card or modem, an integrated services digital network (ISDN) card, a cable modem, or a telephone modem to provide a data communication connection to a corresponding type of telephone line. As another example, the communications interface 32 may be a local area network (LAN) card (e.g., for Ethernet™ or an Asynchronous Transfer Model (ATM) network) to provide a data communication connection to a compatible LAN. As yet another example, the communications interface 32 may be a wire or a cable connecting the terminal device 12 with a LAN, or with accessories such as biometric capture devices. Further, the communications interface 32 may include peripheral interface devices, such as a Universal Serial Bus (USB) interface, a PCMCIA (Personal Computer Memory Card International Association) interface, and the like. Thus, it should be understood that the communications interface 32 may enable the terminal device 12 to conduct any type of wireless or wired communications such as, but not limited to, accessing the Internet over the network 18. Although the terminal device 12 includes a single communications interface 32, the terminal device 12 may alternatively include multiple communications interfaces 32.

The communications interface 32 also allows the exchange of information across networks such as the communications network 18. The exchange of information may involve the transmission of radio frequency (RF) signals through an antenna (not shown). Moreover, the exchange of information may be between the terminal device 12 and between any other computer systems and any other devices capable of communicating over the communications network 18. Such other devices include, but are not limited to, the terminal device 14 and such other computer systems include, but are not limited to, the computer system 16. The terminal device 14 is a computing device substantially the same as terminal device 12.

The computer system 16 is an authentication computer system. The computer system 16 may include a web server, a database server, an application server, a directory server and a disk storage unit that may be used to store any kind of data. The disk storage unit may store at least one database such as, but not limited to, an authentication database. The application server stores applications therein that cause the computer system 16 to perform the functions described herein. The computer system 16 may also include a database management server and an authentication server. The database management server may be used to facilitate transferring data to and from the disk storage device. The authentication server may perform matching of any feature or information associated with users to authenticate the identity of users as described herein.

The components that make up the computer system 16 each have the same fundamental computer architecture as the terminal device 12 described herein with respect to FIG. 2. That is, each of the components includes at least a processor and a memory that communicate over a bus, and a communications interface. Moreover, each of the components may include a user interface, a display and a sensing device.

The authentication database may store data records for users, some of whom are associated with the terminal device 12 and others who are associated with different computing devices. Data in each of the user data records may be captured with the terminal device 12 or may be read or extracted from identity documents or from legacy databases included in other computer systems.

The computer system 16 may also store configurable authentication policies, some of which may be used to determine data that is to be captured from users during any type of transaction, for example, an authentication transaction. Such data is known as an authentication data requirement. The authentication data requirement is the authentication data desired to be captured from users during authentication transactions. Authentication data is biometric data for any biometric modality desired to be used as the basis for authenticating a user. Such biometric modalities include, but are not limited to, face, iris, palm, finger, and any combination thereof.

The communications network 18 is a 5G communications network. Alternatively, the communications network 18 may be any wireless network including, but not limited to, 4G, 3G, Wi-Fi, Bluetooth, Global System for Mobile (GSM), Enhanced Data for GSM Evolution (EDGE), and any combination of a LAN, a wide area network (WAN) and the Internet. The network 18 may also be any type of wired network or a combination of wired and wireless networks.

Figure 3:
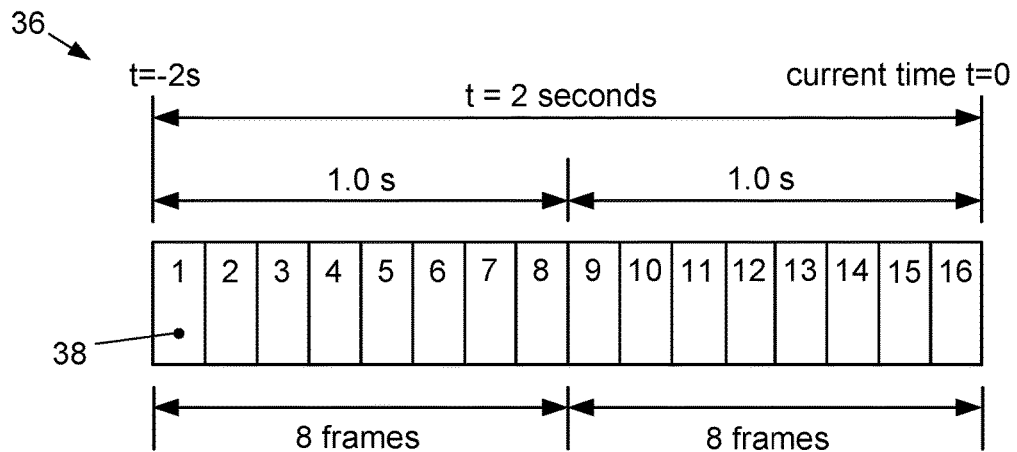
FIG. 3 is a diagram illustrating an example buffer for storing data.

FIG. 3 is a diagram illustrating an example buffer 36 for storing data extracted from, derived from, or calculated from data included in a video frame 38 captured and processed by the terminal device 12. Such data includes, but is not limited to, biometric data and quality feature values. The buffer 36 is two seconds long and extends back from the current time. However, the buffer 36 may alternatively be of any temporal length. Data for a total of sixteen frames 38 is stored in the buffer 36. However, the number of frames for which data can be stored in the buffer can be any number that comports with the frame processing rate. The buffer 36 may be in the terminal device 12.

For biometric data captured as a video, the terminal device 12 extracts frames from the video at a rate greater than the rate at which the terminal device 12 typically processes the extracted frames. Consequently, the terminal device 12 does not process all of the extracted frames. Moreover, because some extracted frames may take more or less time to process and because the data of some processed frames may be unacceptable, the frame processing rate is typically different for each authentication transaction. As a result, the number of frames processed per second, or the frame processing rate, varies. Consequently, the number of frames 38 for which data may be stored in the buffer 36 depends on the frame processing rate. Because data for sixteen frames is included in the buffer 36, the frame processing rate is eight frames per second.

Frame processing rates lower than seven frames per second have been known to provide imposters with the time needed to substitute fraudulent authentication data with which to conduct spoof attacks. Moreover, such frame processing rates have been known to provide insufficient data for resolving particular challenge response constraints, for example, detecting eye blinks. Consequently, frame processing rates between seven and ten frames per second are typically the lowest frame processing rates that can be used to effectively detect user live-ness and thus enhance security during authentication transactions.

Figure 4:
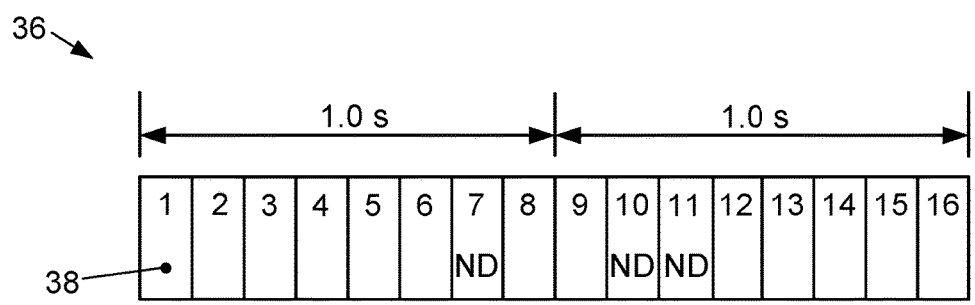
FIG. 4 is a diagram illustrating the example buffer as shown in FIG. 3, further including frame designations indicating no data.

The information shown in FIG. 4 is the same information shown in FIG. 3 as described in more detail in FIG. 4. As such, features illustrated in FIG. 4 that are identical to features illustrated in FIG. 3 are identified using the same reference numeral used in FIG. 3.

FIG. 4 is a diagram illustrating the example buffer 36 as shown in FIG. 3. However, frames 7, 10, and 11 are designated no data (ND), which indicates that the biometric data for those frames was inadequate, or poor, so was not stored in the buffer 36. Consequently, the effective frame processing rate for the first one second period is seven frames per second and for the second one second period is six frames per second. As a result, the data for the frames captured during the first period may be used for detecting user live-ness as well as conducting authentication matching transactions, but the data for the frames captured during the second period cannot.

The data for a frame may be included in different time periods. However, the data may not be usable in each period. For example, the data for frame 12 cannot be used in the second time period because the effective frame processing rate is too low. However, after data for additional frames is stored in the buffer 36, the data for frame 12 may be included in a later one-second time period having an effective frame processing rate at least equal to seven frames per second. As a result, the data for frame 12 could be used for detecting user live-ness and conducting authentication matching transactions in a later one-second time period.

The quality of a captured biometric data image is assessed by evaluating several different quality features including, but not limited to, the sharpness, resolution, illumination, roll orientation, and facial pose deviation of the image. For each frame, a quality feature value is calculated for each different quality feature. The quality feature values enable reliably judging the quality of captured biometric data. The quality feature values calculated for each frame, as well as the captured biometric data associated with each respective frame are stored in the buffer 36.

The sharpness of each captured biometric data image is evaluated to ensure that the lines and/or edges are crisp. Captured biometric data images including blurry lines and/or edges are not considered sharp. A quality feature value for the sharpness is calculated based on the crispness of the lines and/or edges.

The resolution of a captured biometric data image is evaluated to ensure that the details included in the captured biometric data image are distinguishable from each other. Distances between features included in the image may be used to determine whether or not details therein are distinguishable from each other. For example, for face biometric data, the distance may be measured between the eyes. The distance is measured in pixels. When the distance between the eyes is equal to or greater than sixty-four pixels the details are considered to be distinguishable from each other. Otherwise, the details are not considered to be distinguishable from each other and the resolution is deemed inadequate. A quality feature value for the resolution is calculated based on the measured distance.

Illumination characteristics included in the captured biometric data image are evaluated to ensure that during capture the biometric data was adequately illuminated and that the captured image does not include shadows. A quality feature value based on the illumination characteristics is also calculated for the captured biometric data image.

The roll orientation of captured biometric data images is also evaluated to ensure that the biometric data was captured in a position that facilitates accurately detecting user live-ness and generating trustworthy authentication results.

Figure 5:
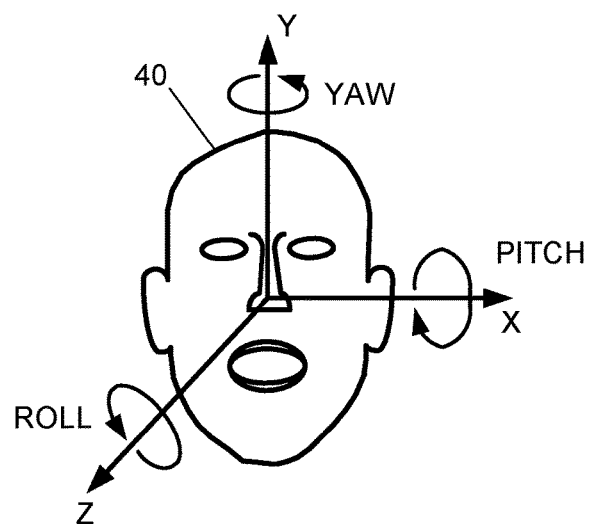
FIG. 5 is an example face biometric data image with a Cartesian coordinate system superimposed thereon.

FIG. 5 is an example face biometric data image 40 captured from the user 10 during an authentication transaction. The image 40 has a three-dimensional Cartesian coordinate system superimposed thereon. The Cartesian coordinate system has X, Y, and Z-axes and is positioned such that the origin is coincident with the tip of the user's nose and such that the Y-axis is coincident with a centerline of the user's face. Such positioning facilitates accurately detecting user live-ness and generating trustworthy authentication results. Alternatively, the origin may be positioned at any location on the facial image 40. Rotation of the image 40 about the X-axis is called pitch, rotation of the image 40 about the Y-axis is called yaw, and rotation of the image 40 about the Z-axis is called roll.

Figure 5A:
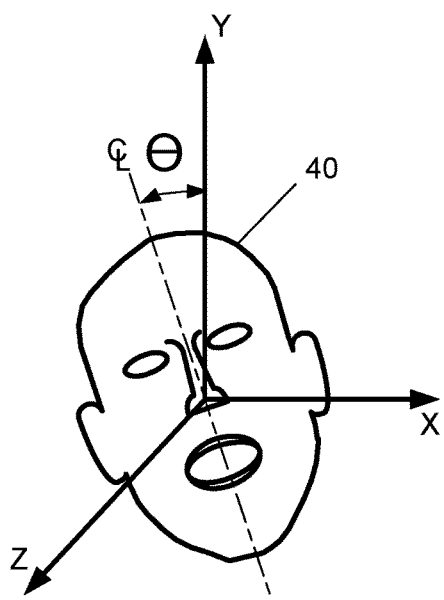
FIG. 5A includes the face biometric data image as shown in FIG. 5; however, the image in FIG. 5A is rotated counterclockwise.
Figure 5B:
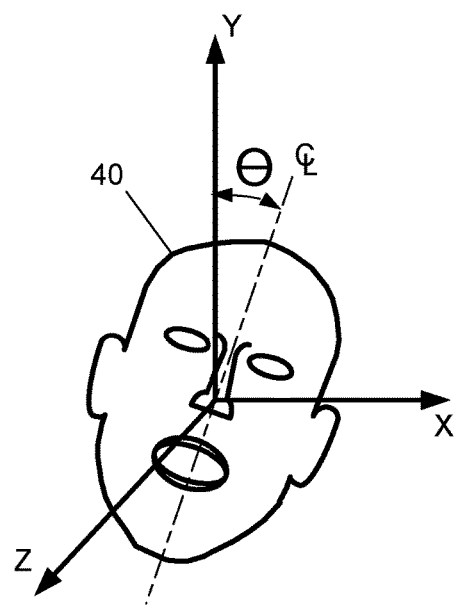
FIG. 5B includes the face biometric data image as shown in FIG. 5; however, the image in FIG. 5B is rotated clockwise.

The information shown in FIGS. 5A and 5B is the same information shown in FIG. 5 as described in more detail in FIGS. 5A and 5B. As such, features illustrated in FIGS. 5A and 5B that are identical to features illustrated in FIG. 5 are identified using the same reference numeral used in FIG. 5.

FIGS. 5A and 5B include the facial biometric data image 40 as shown in FIG. 5. However, the captured facial biometric image 40 in FIGS. 5A and 5B is not symmetrically oriented about the Z-axis. Rather, the biometric data image 40 is rotated counterclockwise and clockwise in FIGS. 5A and 5B, respectively, with respect to the Z-axis by an angle θ. Thus, FIGS. 5A and 5B illustrate roll. Facial biometric data images 40 captured at any angle θ may be used for detecting user live-ness and generating trustworthy authentication results. The roll orientation quality feature value is calculated based on the angle θ.

The biometric data image 40 may alternatively or additionally be rotated about the X-axis (i.e., pitch angle), the Y-axis (i.e., yaw angle), or both the X and Y-axes. The facial pose deviation quality feature value is a measure of a plane of the biometric data image 40 with respect to the image plane defined by the X and Y-axes and is calculated from the yaw angle, the pitch angle, or both the yaw and pitch angles. Moreover, the facial pose quality feature value may be combined with the roll orientation quality feature value to yield a total orientation quality feature value. The roll orientation quality feature value and the total orientation quality feature value typically vary significantly when a user is challenged to nod, shake his head, and/or blink. Consequently, varying roll orientation feature values, as well as varying total orientation quality feature values, may be used to determine whether a user has successfully complied with a challenge.

The quality of captured biometric data images is determined by using the quality feature values calculated for a frame. The quality feature value for each different quality feature is compared against a respective threshold quality feature value. For example, the sharpness quality feature value is compared against the threshold quality feature value for sharpness. When each different quality feature value for a frame satisfies the respective threshold quality feature value, the quality of the biometric data image included in the frame is adequate. As a result, the captured biometric data image may be stored in the buffer 36 and may be used for detecting user live-ness and for generating trustworthy authentication transaction results. When at least one of the different quality feature values does not satisfy the respective threshold, the biometric data image quality is considered inadequate, or poor.

The different threshold feature quality values may be satisfied differently. For example, some threshold quality feature values may be satisfied when a particular quality feature value is less than or equal to the threshold quality feature value. Other threshold quality feature values may be satisfied when a particular quality feature value is equal to or greater than the threshold quality feature value. Alternatively, the threshold quality feature value may include multiple thresholds, each of which is required to be satisfied. For example, rotation of the biometric data image 40 may be within a range between −20 and +20 degrees, the thresholds being −20 and +20 degrees.

The quality of the captured biometric data image included in a frame may alternatively be determined by combining, or fusing, the quality feature values for each of the different features into a total quality feature value. The total quality feature value may be compared against a total threshold value. When the total quality feature value meets or exceeds the total threshold value the quality of the biometric data image included in the frame is adequate. Otherwise, the biometric data image quality is considered inadequate, or poor.

Biometric data images captured as a video during spoof attacks are typically characterized by poor quality and unexpected changes in quality between frames. Consequently, analyzing the quality of biometric data captured in each frame, or analyzing changes in the quality of the captured biometric data between frames, or analyzing both the quality and changes in quality may facilitate identifying spoof attacks during authentication transactions and thus facilitate enhancing security of authentication transactions against spoof attacks.

The change in quality of biometric data images stored in the buffer 36 may be determined using the quality feature values stored in the buffer 36. More specifically, a change of a quality feature value is assessed over time for a specific quality feature by calculating a dissimilarity score as the variance of the quality feature values stored in the buffer for the specific quality feature. A dissimilarity score is similarly calculated for each of the different quality features. The dissimilarity score calculated for each different quality feature is compared against a respective threshold dissimilarity score value. When the dissimilarity score calculated for each different quality feature is less than or equal to its respective threshold dissimilarity score value, the change in quality is acceptable and is not considered to be evidence of a possible spoof attack. However, when the dissimilarity score calculated for at least one of the different quality features is greater than its respective threshold dissimilarity score value, the change in quality is considered to be evidence of a possible spoof attack. The quality feature values calculated for each different quality feature are used to compute an average quality value for respective different quality features.

Although the dissimilarity score for each different quality feature is calculated as the variance of the quality values for the respective different quality feature, the dissimilarity score may alternatively be calculated based on any quantity that facilitates determining the change in quality. For example, the dissimilarity score for each different quality feature may be calculated based on the absolute deviation of the quality feature values for each respective quality feature.

The change in quality of biometric data images stored in the buffer 36 may alternatively be determined using the total quality feature values calculated for each frame 38 as well as frames that were processed more than two seconds ago and are no longer stored in the buffer 36. Data for the frames processed more than two seconds ago may be stored in the terminal device 12. More specifically, the dissimilarity score is calculated from all of the stored total quality values, and based on the variance of the total quality feature value of each stored frame. When the calculated dissimilarity score is less than or equal to the threshold dissimilarity score value for total quality, the change in quality for all of the processed frames is acceptable. However, when the calculated dissimilarity score is greater than the threshold dissimilarity score value for total quality the change in quality is unacceptable and is considered to constitute evidence of a possible spoof attack.

Although the quality features described herein are for evaluating biometric data captured as an image, different quality features are typically used to evaluate different biometric modalities. For example, a quality feature used for evaluating voice biometric data is excessive background noise, for example, from traffic. However, excessive background noise used for evaluating voice biometric data cannot be used to evaluate face biometric data images.

Figure 6:
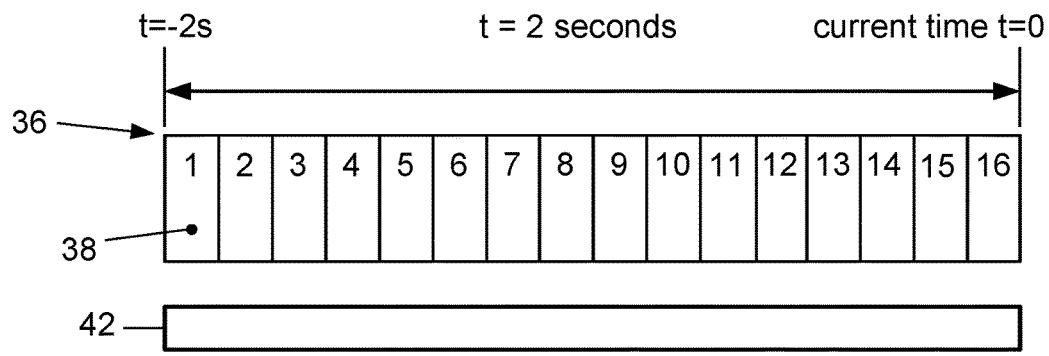
FIG. 6 is a diagram including the example buffer as shown in FIG. 3, further including an example window having a two second temporal length.

FIG. 6 is a diagram including the example buffer 36 as shown in FIG. 3, further including an example temporally variable window 42. The example window 42 is two seconds long and extends back from the current time. The window 42 defines the frames and associated quality values that may be used for determining whether the change in quality of the buffer data is acceptable. Although all of the frames stored in the buffer 36 are within the temporal length of the window 42, only those frames with data are used to determine the change in quality and to determine whether the change in quality is acceptable. The average quality value is calculated using the quality values within the temporal length of the window 42 stored in the buffer 36.

The window 42 may be any temporal length that facilitates detecting user live-ness. The temporal length of the window 42 may be determined in any manner. For example, the temporal length may be determined based on a challenge displayed on the terminal device 12. Challenges are instructions that direct users to make a response. For face biometric data, the challenge may direct the user to nod, shake his head, or blink, or perform any combination of nod, head shake and blink. A challenge for the user to nod his or her head may require a one-and-a-half second window 42, while a challenge for the user to shake his or her head may require a one second window 42. A challenge for the user to blink may require a plurality of windows 42, for example, a one-and-a-half second window, a one second window and a half second window.

Figure 7:
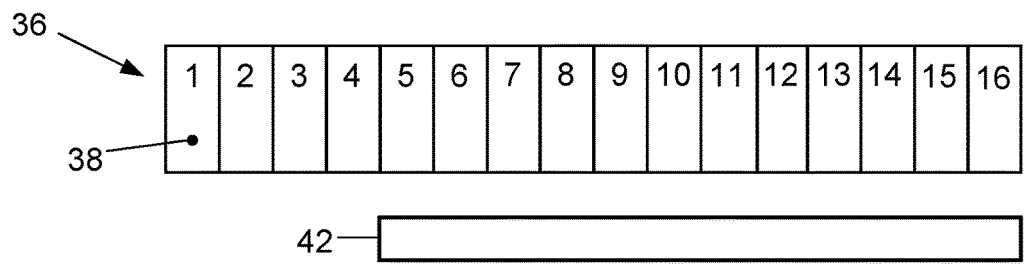
FIG. 7 is a diagram including the example buffer and window as shown in FIG. 6; however, the window has a one-and-a-half second temporal length.
Figure 8:
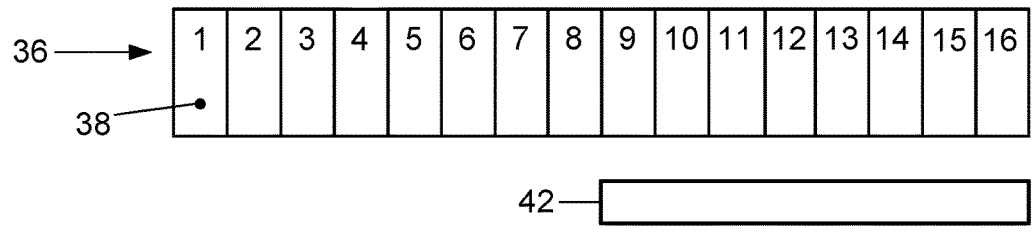
FIG. 8 is a diagram including the example buffer and window as shown in FIG. 6; however, the window has a one second temporal length.
Figure 9:
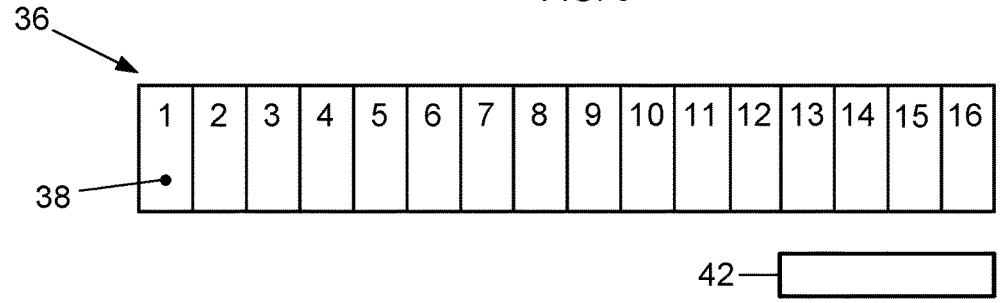
FIG. 9 is a diagram including the example buffer and window as shown in FIG. 6; however, the window has a half second temporal length.

The information shown in FIGS. 7-9 is the same information shown in FIG. 6 as described in more detail below. As such, features illustrated in FIGS. 7-9 that are identical to features illustrated in FIG. 6, are identified using the same reference numerals used in FIG. 6.

FIG. 7 is a diagram including the example buffer 36 and window 42 as shown in FIG. 6. However, the temporal length of the window 42 is one-and-a-half seconds. Consequently, the quality values for those frames within the temporal length of the window 42 are used to determine whether or not the change in quality is acceptable. The average quality score is calculated using the quality values stored in the buffer 36 within the window 42.

FIG. 8 is a diagram including the example buffer 36 and window 42 as shown in FIG. 6. However, the temporal length of the window 42 is one second. Consequently, the quality values for those frames within the temporal length of the window 42 are used to determine whether or not the change in quality is acceptable. The average quality value is calculated using the quality values stored in the buffer 36 within the window 42.

FIG. 9 is a diagram including the example buffer 36 and window 42 as shown in FIG. 6. However, the temporal length of the window 42 is half a second. Consequently, the quality values for those frames within the temporal length of the window 42 are used to determine whether the change in quality is acceptable. The average quality value is calculated using the quality values stored within the buffer 36 within the window 42.

The change in quality may alternatively be determined by combining the dissimilarity scores calculated for each different length window 44 into an overall dissimilarity score. When the overall dissimilarity score exceeds an overall threshold dissimilarity score value, the change in quality is unacceptable. Such a combination of dissimilarity scores may be used to detect user live-ness based on eye blinks.

Figure 10:
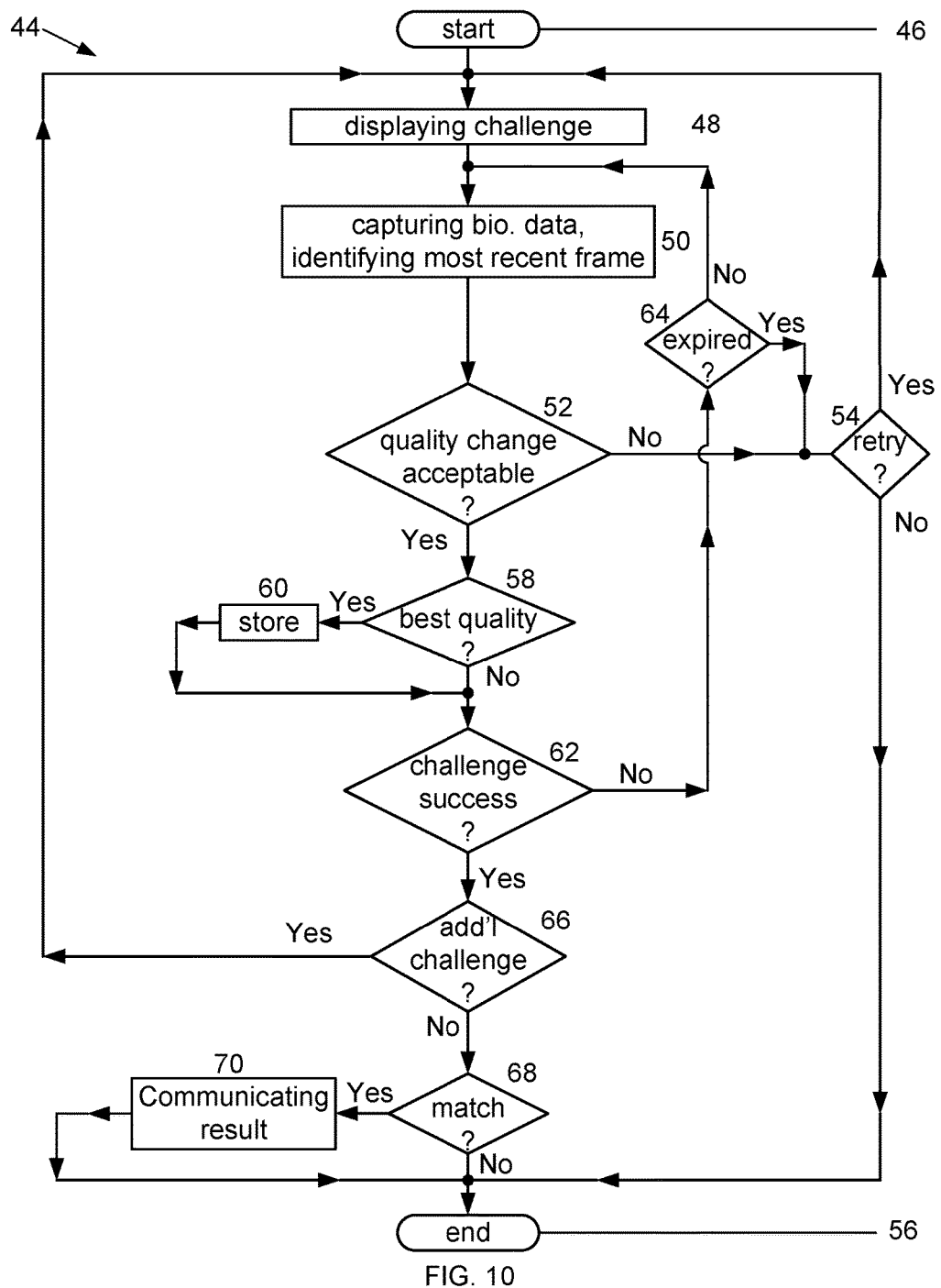
FIG. 10 is a flowchart illustrating an example method for authenticating users.

FIG. 10 is a flowchart 44 illustrating an example method for authenticating users. The process starts 46 when a user of the terminal device 12 communicates a desire to conduct a network-based transaction. The network-based transaction may be any type of transaction. For example, the network-based transaction may be for remotely purchasing merchandise from a merchant web site over the Internet. The merchant web site requires the user to be successfully authenticated before making the purchase. The authentication data requirement is face biometric data captured as a video. A portion of the video is stored in the buffer 36.

Next, the user operates and positions the terminal device 12 to capture biometric data from his self. The terminal device 12 displays 48 a challenge directing the user to blink and captures face biometric data 50 from the user while the user responds to the challenge. While capturing biometric data 50, the terminal device 12 identifies 50 a most recently captured frame, extracts a biometric data image from the most recently captured frame, and assigns a time stamp to the most recently captured frame.

Next, processing continues by calculating the quality feature values for the extracted image and determining 52 whether the change in quality of the biometric data images stored in the buffer 36 is acceptable. Because the challenge directs the user to blink, a plurality of windows 42 of different temporal length are used to determine the change in quality. When the change in quality is not acceptable, the extracted biometric data image may be evidence of a possible spoof attack. As a result, the extracted biometric data image is not considered appropriate for use in a biometric authentication matching transaction. Next, processing continues by determining whether the user would like to retry 54 capturing biometric data. If so, processing continues by displaying 48 a subsequent challenge for the user to see. The subsequent challenge may be the same or different than the previous challenge. However, if the user decides not to retry 54 the user is not permitted to conduct the desired network-based transaction and processing ends 56. Users may retry 54 capturing biometric data three times. Alternatively, users may retry 54 any number of times.

When the change in quality 52 is acceptable, the extracted biometric data image is not considered evidence of a possible spoof attack and is thus considered appropriate for use in a biometric authentication matching transaction. Consequently, the extracted biometric data image is stored in the buffer 36. Next, processing continues by determining 58 whether the quality of the extracted biometric data image is better than the quality of other images previously captured from the user while responding to the displayed challenge. More specifically, processing continues by calculating a weighted sum for the most recently captured frame and comparing the calculated weighted sum against a weighted sum for a best quality image. The best quality image is a previously captured image deemed to have the best quality of all the other previously captured images. The best quality image and a weighted sum calculated for the best quality image are stored in a different location of the memory 22 than the buffer 36. Alternatively, any method based on the quality measures may be used to determine the best quality image.

When the calculated weighted sum is less than or equal to the weighted sum for the best quality image, processing continues by determining 62 whether the user successfully responded to the challenge. However, when the calculated weighted sum is greater than the weighted sum of the best quality image, the extracted biometric data image is a better quality image than the stored best quality image. As a result, processing continues by removing the best quality image and associated data from the memory 22 and storing 60 the extracted biometric data image and other data associated with the extracted image in the memory 22. Thus, the extracted biometric data image may be the best quality image stored in the memory 22. Coefficients used for calculating the weighted sums are typically determined before starting 46 to authenticate the user.

Next, processing continues by determining 62 whether the user successfully responded to the challenge using an eye-blink based live-ness detection algorithm. When it is determined that the user did not blink, processing continues by determining that the user did not successfully respond to the challenge 62 and by determining 64 whether a period of time for successfully responding to the challenge has expired. The period of time is five seconds. Alternatively, the period of time may be any period of time that facilitates quickly determining whether the user successfully responded to the challenge. When the period of time has not expired 64, processing continues by capturing biometric data 50 from the user while the user responds to the challenge. Otherwise, when the period of time has expired 64, processing continues by determining 54 whether the user would like to retry 54 capturing biometric data.

However, when it is determined 62 that the user successfully responded to the challenge, processing continues by determining 66 whether the user is required to successfully respond to an additional challenge. The user is required to successfully respond to three challenges before an additional challenge is not required. Consequently, when the user has not successfully responded to three challenges, processing continues by emptying the buffer 36 of data captured for the previous challenge and displaying 48 a subsequent challenge on the terminal device 12.

When the user has successfully responded to three challenges 66 processing continues by conducting an authentication matching transaction 68 in which a template of the best biometric data image stored in the memory 22 is compared against a corresponding record biometric template of the user. When the best and record biometric templates match 68, the user is successfully authenticated and processing continues by communicating 70 the successful authentication result to the merchant website. The merchant web site may permit the user to conduct the desired transaction. Next, processing ends 56. However, when the best and record biometric templates do not match 68, the user is not successfully authenticated and processing ends 56.

Although the challenges in the example method described with regard to FIG. 10 are nod, head shake, and blink for face biometric data, it should be understood that the challenges differ depending on the biometric data being captured. Moreover, it should be appreciated that any number of frames may be captured for each challenge and that any number of authentication matching transactions may be conducted for each challenge.

Although an eye-blink based live-ness detection algorithm is used in the example method described with regard to FIG. 10 to determine whether the user successfully responded to the challenge, in alternative methods the liveness detection algorithm corresponds to the biometric data captured while responding to a challenge. Instead of using an algorithm to determine whether the user successfully responded to the challenge, alternative methods may determine success using the quality feature values calculated for a quality feature. For example, because the quality feature values calculated for the roll orientation remain roughly constant over a sequence of frames when the challenge is an eye blink, the roll orientation quality feature values may be used to determine whether the behavior of the user is consistent with the challenge.

Although users are required to successfully respond to three challenges in the example method described with regard to FIG. 10, in alternative example methods users may successfully respond to any number of challenges. The challenges may be the same or different from each other. It should be understood that in the example method described with regard to FIG. 10, only one image obtained while responding to the three challenges is considered to be the best quality biometric image.

Figure 11:
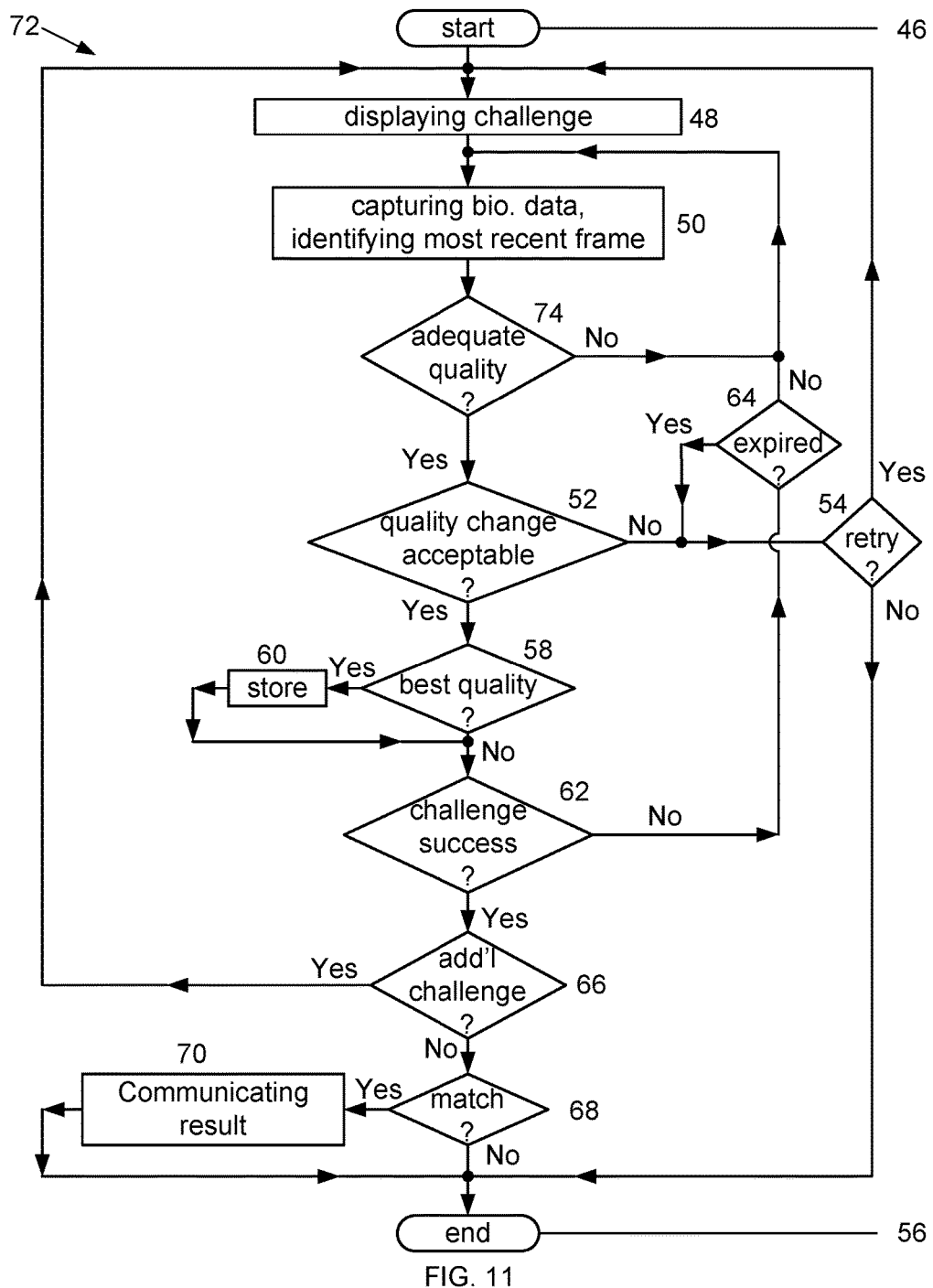
FIG. 11 is a flowchart illustrating an alternative example method for authenticating users.

The information shown in FIG. 11 is the same information shown in FIG. 10 as described in more detail below. As such, features illustrated in FIG. 11 that are identical to features illustrated in FIG. 10, are identified using the same reference numerals used in FIG. 10.

FIG. 11 is a flowchart 72 illustrating an alternative example method of authenticating users. This alternative method is similar to that shown in FIG. 10. However, the quality of the biometric data included in each frame 38 is assessed before determining 52 whether the change in quality of the biometric data images is acceptable. More specifically, after extracting the biometric data image, processing continues by determining 74 whether the quality of the extracted biometric data image is adequate. When the quality of the extracted biometric data image is inadequate 74, or poor, processing continues by capturing biometric data 50 from the user while the user responds to the displayed challenge. Thus, it should be understood that inadequate, or poor, biometric data images are not stored in the buffer 36 or otherwise stored in the memory 22, and are not used to detect user live-ness or to conduct authentication transactions.

When the quality of the extracted biometric data image is adequate 74, processing continues by determining 52 whether the change in quality of the biometric data images is acceptable. Thus, only adequate quality biometric data is stored in the buffer 36. As a result, the live-ness detection success rate and the trustworthiness of authentication transaction results are facilitated to be increased. Next, processing continues by conducting steps 52, 54, 56, 58, 60, 62, 64, 66, 68 and 70 as described herein with regard to FIG. 10.

Although poor quality biometric data is not stored in the buffer 36 or the memory 22 in this alternative example method, in other methods poor quality biometric data may be stored in the buffer 36, or otherwise stored in the memory 22, when a tolerance policy permits doing so. For example, a tolerance policy may permit storing poor quality biometric data for a number frames in the buffer 36 in any two second time interval. The number of frames may be any number as long as adequate quality data is in the buffer 36 from which an accurate quality assessment can be made.

Figure 12:
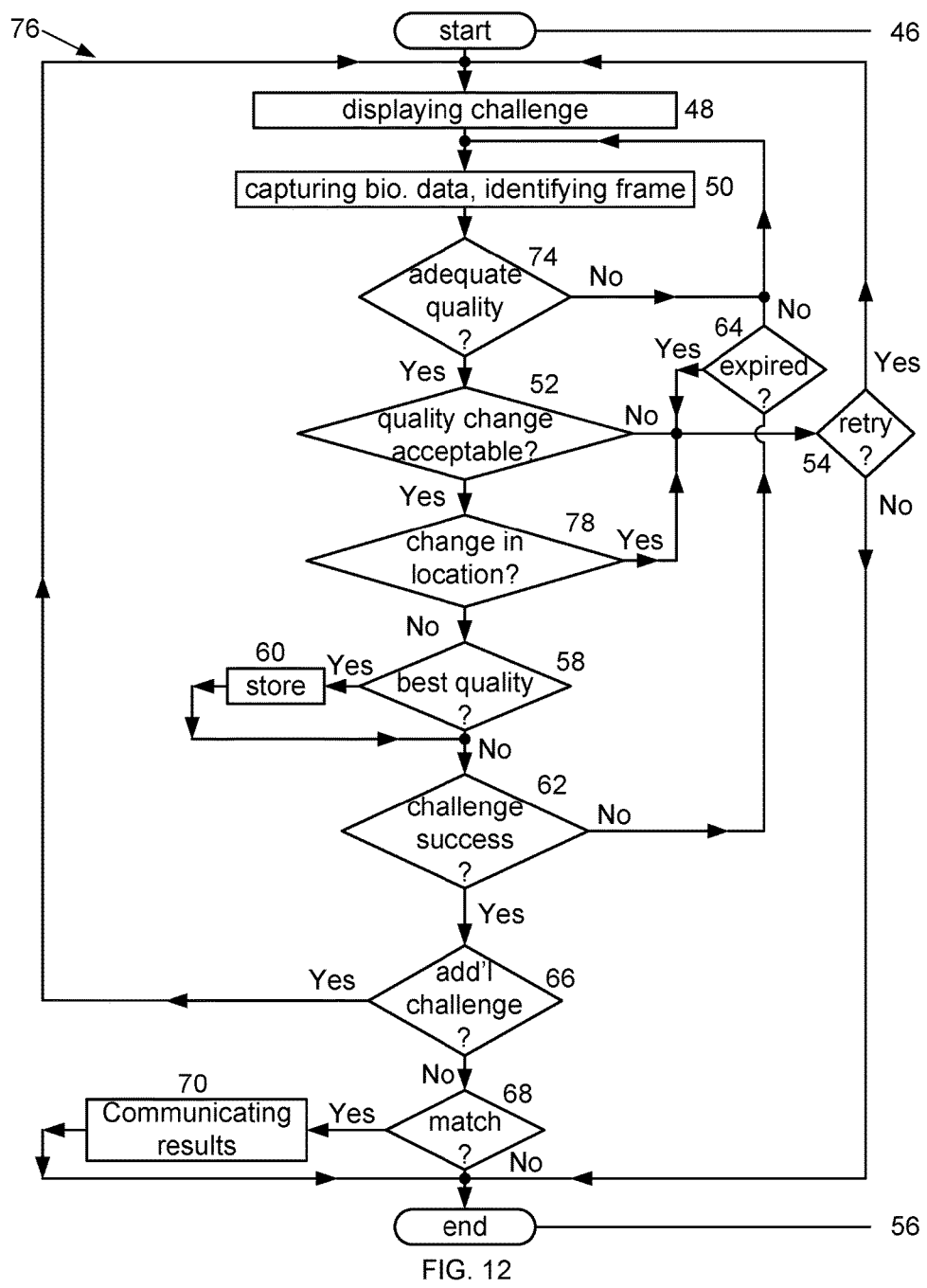
FIG. 12 is a flowchart illustrating another alternative example method for authenticating users.

The information shown in FIG. 12 is the same information shown in FIG. 11 as described in more detail below. As such, features illustrated in FIG. 12 that are identical to features illustrated in FIG. 11, are identified using the same reference numerals used in FIG. 11.

FIG. 12 is a flowchart 76 illustrating another alternative example method of authenticating users. This alternative method is similar to that shown in FIG. 11. However, the extracted biometric data image is not deemed appropriate for use in a biometric authentication matching transaction when the change in quality alone is acceptable. Rather, the biometric data image is deemed appropriate for use in a biometric authentication matching transaction after a change in location of the eyes is within an expected range and the change in quality is acceptable. More specifically, after determining that the change in quality 52 is acceptable, processing continues by determining 78 whether the location of a biometric characteristic included in the captured biometric data has changed unexpectedly. Unexpected changes may be evidence of a possible spoof attack. In this alternative method, the biometric characteristic is the eyes. However, in alternative methods, the biometric characteristic may be any characteristic included in facial biometric data including, but not limited to, the tip of the nose or mouth. The biometric characteristic depends on the mode of biometric data captured.

Next, processing continues by calculating a distance between the eyes in the extracted image as well as in the image stored in the buffer 36 for the previously processed frame 38. When a biometric characteristic different than the eyes is used, a different distance is calculated. For example, when the biometric characteristic is the tip of the nose, the calculated distance may be between the tip of the nose and an outer corner of either eye, or between the tip of the nose and the chin.

After calculating the distances, processing continues by calculating a difference between the distances. When the difference exceeds a tracking threshold change, the difference is considered to be an unexpected change that may be evidence of a possible spoof attack. Consequently, processing continues by determining whether the user would like to retry 54 capturing biometric data. If so, processing continues by displaying 48 a subsequent challenge for the user to see. However, if the user decides not to retry 54 the user is not permitted to conduct the desired network-based transaction and processing ends 56. When the difference is less than or equal to the tracking threshold change, the difference is not considered evidence of a possible spoof attack and processing continues by conducting steps 56, 58, 60, 62, 64, 66, 68, and 70 as described herein with regard to FIG. 10. In this alternative example method the tracking threshold change is ten percent. However, the tracking threshold change may alternatively be any percentage that enhances security during authentication transactions.

Figure 13:
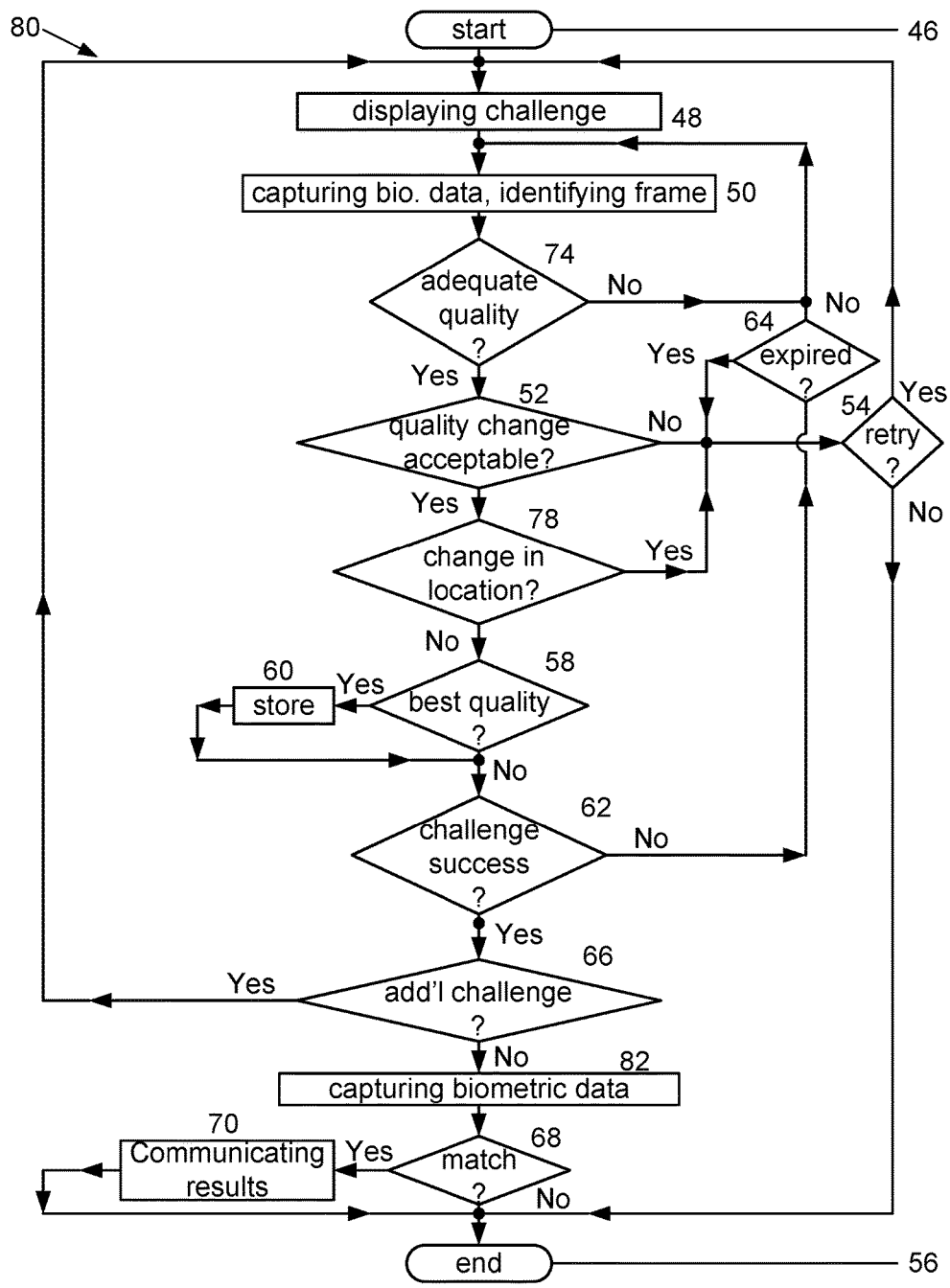
FIG. 13 is a flowchart illustrating yet another alternative example method for authenticating users.

The information shown in FIG. 13 is the same information shown in FIG. 12 as described in more detail below. As such, features illustrated in FIG. 13 that are identical to features illustrated in FIG. 12 are identified using the same reference numerals used in FIG. 12.

FIG. 13 is a flowchart 80 illustrating yet another alternative example method of authenticating users. This alternative method is similar to that shown in FIG. 12. However, the best quality biometric data captured for each of the three different challenges is stored 60 in the memory 22, and a separate authentication matching transaction is conducted based on each of the three best quality biometric data images. Moreover, additional biometric data is captured from the user prior to conducting the three authentication matching transactions 68.

More specifically, after determining 66 that an additional challenge is not required, processing continues by capturing 82 additional biometric data from the user with the terminal device 12. The additional biometric data is the same as that captured in step 50; however, the user does not respond to a challenge.

Next, processing continues by conducting four separate authentication matching transactions 68. Three different templates, each corresponding to one of the three stored best quality biometric data images are each compared against a corresponding record biometric template of the user. Thus, three different comparisons are made. Moreover, a template for the additional biometric data is compared against a corresponding record biometric template of the user. When all of the templates match their corresponding user record biometric template, the user is successfully authenticated. Next, processing continues by communicating 70 the successful result to the merchant website which may permit the user to conduct the desired transaction. Next, processing ends 56. Otherwise, the user is not successfully authenticated and processing ends 56.

The example methods described herein may be conducted entirely by the terminal device 12, or partly on the terminal device 12 and partly on other devices (not shown) and systems (not shown) able to communicate with the terminal device 12 over the network 18. Moreover, data described herein as being stored in the memory 22 may alternatively be stored in any system (not shown) or device (not shown) able to communicate with the terminal device 12 over the network 18.

The above-described example methods and systems for authenticating users facilitate detecting the physical presence of users during authentication transactions and enhance the trustworthiness and accuracy of authentication matching transaction results. More specifically, biometric data is captured from a user as a video while the user responds to challenges. After identifying a most recent frame in the video, a biometric data image is extracted from the most recent frame and is evaluated for quality. When the quality of the extracted biometric data image is adequate, the change in quality of the biometric data images stored in a buffer is evaluated. When the change in quality is acceptable, the extracted biometric data image is not considered to be from a spoof attack so the extracted biometric data image is stored in the buffer.

The location of a biometric characteristic included in the extracted biometric data image is compared against the location of the same biometric characteristic included in the biometric data image from a preceding frame. When a distance between the locations satisfies a tracking threshold change, the extracted biometric data image is not considered to be from a spoof attack. Moreover, a best biometric data image captured while responding to the challenges is determined, and if the user successfully responded to the challenges, the best biometric data image is used in an authentication matching transaction. As a result, the live-ness detection success rate and the trustworthiness of authentication transaction results are facilitated to be increased.

The example methods for authenticating users described above should not be considered to imply a fixed order for performing the process steps. Rather, the process steps may be performed in any order that is practicable, including simultaneous performance of at least some steps. Moreover, the methods are not limited to use with the specific computer systems described herein, but rather, the methods can be utilized independently and separately from other computer components described herein. Furthermore, the invention is not limited to the embodiments of the methods described above in detail. Rather, other variations of the methods may be utilized within the spirit and scope of the claims.

What is claimed is:

1. A method for determining an image is a genuine image of a user comprising:
    capturing in a sequence of frames during a remotely conducted biometric authentication transaction, by a computing device, images of a biometric modality of the user while the user responds to a challenge displayed by the computing device;
    extracting the images of the biometric modality from the frames in the sequence;
    calculating quality feature values for the frames from which the images were extracted, each quality feature value corresponding to a different quality feature;
    storing the extracted images and quality feature values in a buffer of the computing device, the images and quality feature values being within a temporal window of the buffer, the temporal window having a length determined based on the challenge;
    calculating a score for each different quality feature using the corresponding quality feature values; and
    determining, by the computing device, a most recent frame in the sequence includes a genuine image of the user when the calculated score for each different quality feature satisfies a respective threshold score value.

2. A method for determining an image is a genuine image of a user in accordance with claim 1 further comprising storing the genuine image in the buffer.

3. A method for determining an image is a genuine image of a user in accordance with claim 1 further comprising:
    calculating a weighted sum for the most recently captured frame;
    comparing the calculated weighted sum against a weighted sum for a stored best quality image;
    determining the genuine image is a better quality than the stored best quality image when the calculated weighted sum is greater than the stored best quality image weighted sum; and
    replacing the stored best quality image with the genuine image.

4. A method for determining an image is a genuine image of a user in accordance with claim 1 further comprising determining whether the user successfully responded to the challenge using an eye-blink based liveness detection algorithm.

5. A computing device for determining an image is a genuine image of a user comprising:
- a processor; and
- a memory configured to store a buffer of data, said device being associated with a network and said memory being in communication with said processor and having instructions stored thereon which, when executed by said processor, cause said computing device to:
- capture in a sequence of frames, during a remotely conducted authentication transaction, images of a biometric modality of the user while the user responds to a challenge displayed by said computing device;
- extract the images of the biometric modality from the frames in the sequence;
- calculate quality feature values for the frames from which the images were extracted, each quality feature value corresponding to a different quality feature;
- store the extracted images and quality feature values in the buffer, the images and quality feature values being within a temporal window of the buffer, the temporal window having a length determined based on the challenge;
- calculate a score for each different quality feature using the corresponding quality features values; and
- determine a most recent frame in the sequence includes a genuine image of the user when the calculated score for each different quality feature satisfies a respective threshold score value.

6. A computing device in accordance with claim 5, wherein the instructions when read and executed by said processor further cause said computing device to store the genuine image in the buffer.

7. A computing device in accordance with claim 5, wherein the instructions when read and executed by said processor further cause said computing device to:
- calculate a weighted sum for the most recently captured frame;
- compare the calculated weighted sum against a weighted sum for a stored best quality image;
- determine the genuine image is a better quality than the stored best quality image when the calculated weighted sum is greater than the stored best quality image weighted sum; and
- replace the stored best quality image with the genuine image.

8. A computing device in accordance with claim 5, wherein the instructions when read and executed by said processor further cause said computing device to
- determine whether the user successfully responded to the challenge using an eye-blink based liveness detection algorithm.

9. A computer program recorded on a non-transitory computer-readable recording medium included in a computing device for determining an image is a genuine image of a user, the computer program being comprised of instructions, which when read and executed by the computing device, cause the computing device to:
- capture in a sequence of frames, during a remotely conducted authentication transaction, images of a biometric modality of the user while the user responds to a challenge displayed by the computing device;
- extract the images of the biometric modality from the frames in the sequence;
- calculate quality feature values for the frames from which the images were extracted, each quality feature value corresponding to a different quality feature;
- store the extracted images and quality feature values in a buffer of the computing device, the images and the quality feature values being within a temporal window of the buffer, the temporal window having a length determined based on the challenge;
- calculate a score for each different quality feature using the corresponding quality features values; and
- determine a most recent frame included in the sequence includes a genuine image of the user when the calculated score for each different quality feature satisfies a respective threshold score value.

10. A computer program in accordance with claim 9 further comprising instructions, which when read and executed by the computing device cause the computing device to store the genuine image in the buffer.

11. A computer program in accordance with claim 9 further comprising instructions, which when read and executed by the computing device cause the computing device to:
- calculate a weighted sum for the most recently captured frame;
- compare the calculated weighted sum against a weighted sum for a stored best quality image;
- determine the genuine image is a better quality than the stored best quality image when the calculated weighted sum is greater than the stored best quality image weighted sum; and
- replace the stored best quality image with the genuine image.

12. A computer program in accordance with claim 9 further comprising instructions, which when read and executed by the computing device cause the computing device to
- determine whether the user successfully responded to the challenge using an eye-blink based liveness detection algorithm.

* * * * *